F. KIEHLER.
VEHICLE TOP BOW HOLDER.
APPLICATION FILED JAN. 22, 1916.
1,269,823.
Patented June 18, 1918.
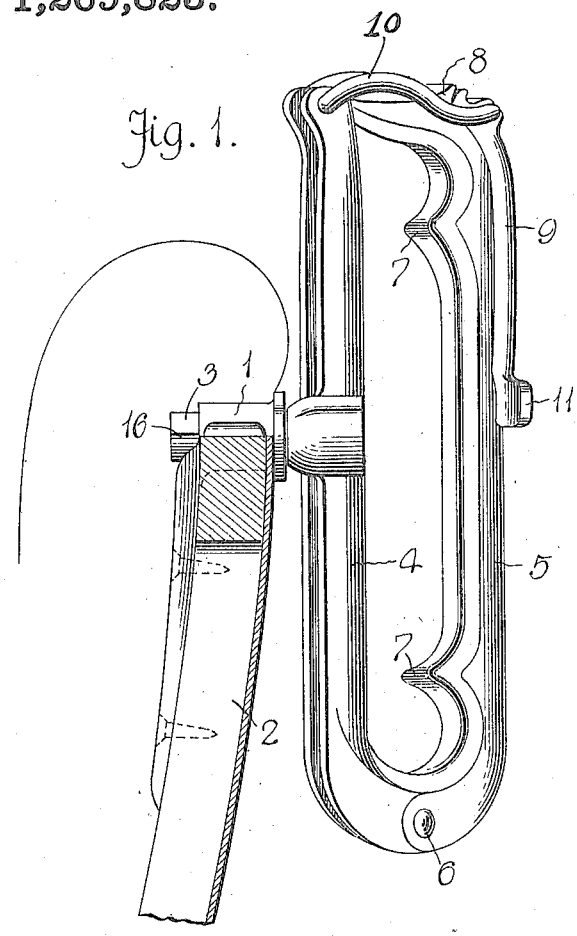
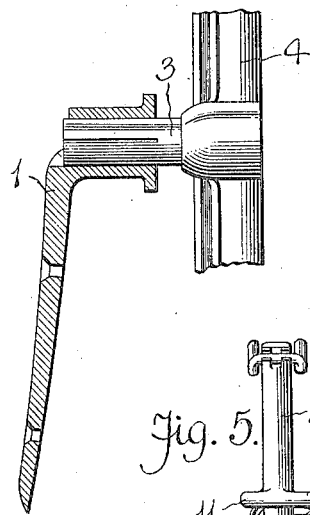
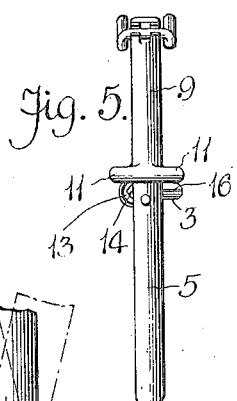
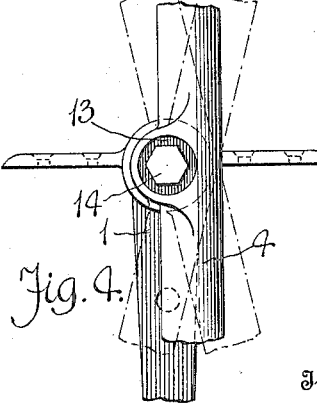
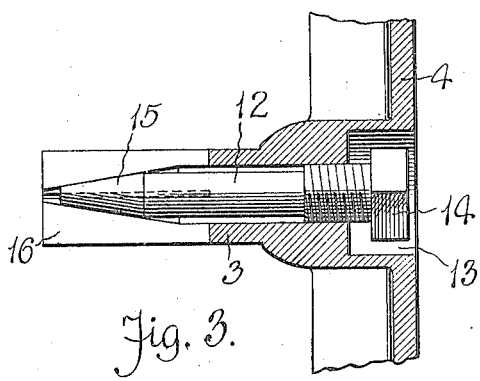
Witness
Chas. W. Stauffer
Inventor
Frederich Kiehler,
By
Attorneys

UNITED STATES PATENT OFFICE.

FREDERICK KIEHLER, OF DETROIT, MICHIGAN, ASSIGNOR TO AUTO SPECIALTIES MANUFACTURING COMPANY, OF ST. JOSEPH, MICHIGAN, A CORPORATION OF CALIFORNIA.

VEHICLE-TOP BOW-HOLDER.

1,269,823.  Specification of Letters Patent. Patented June 18, 1918.

Application filed January 22, 1916. Serial No. 73,517.

*To all whom it may concern:*

Be it known that I, FREDERICK KIEHLER, a citizen of the United States of America, residing at Detroit, in the county of Wayne and State of Michigan, have invented certain new and useful Improvements in Vehicle-Top Bow-Holders, of which the following is a specification, reference being had therein to the accompanying drawings.

This invention relates to a vehicle-top bow-holder and means for adjusting and attaching the same to a vehicle body. The object of the invention is to provide means whereby the holder may be quickly attached or detached, may be adjusted toward or from the sides of the vehicle body and may be tilted or turned upon a horizontal axis into proper transverse relation to the vehicle bows.

A further object is to so construct and arrange the attaching means, that when the holder is detached, there will be no unsightly projection on the body, and further the securing means will be concealed within the frame of the holder, so that the bows cannot be marred by contact therewith and there will be no obtrusive or unsightly projections. It is also an object of the invention to provide a holder with suitable clamping means having a convenient finger hold affording adequate leverage by means of which the holder may be quickly released or secured in locked position.

A further object of the invention is to provide certain other and useful features in the construction and arrangement of parts, all as hereinafter more specifically described and particularly pointed out in the appended claims, reference being had to the accompanying drawings, in which—

Figure 1 is a side elevation of a holder embodying the invention and showing the same in operative position upon a vehicle body;

Fig. 2 is a detail showing a socket member in longitudinal section and a portion of the holder in engagement therewith;

Fig. 3 is an enlarged detail showing a slit stem of the holder in longitudinal section;

Fig. 4 is a detail showing the parts disclosed in Fig. 2 in side elevation; and

Fig. 5 is a reduced view showing the holder in edge elevation.

In automobile construction, a vehicle top is supported in folded position with the bows extending rearwardly along the sides of the body, by suitable supports projecting from the sides of the body and having means for embracing the bows to hold and clamp the same in folded position. When the top is raised to operative position, these bow supports or holders present an unsightly appearance projecting from the sides of the body, and are liable to be injured or lost off during the use of the vehicle. It is therefore advantageous to be able to readily remove these supports or holders and it is also advantageous that they be so attached that when removed, there will be no projection on the body to mar its appearance or to catch on the top-curtain or anything into contact with which they may come. It is also important that the holder itself shall have a minimum number of projections or sharp angles to minimize the liability of anything catching thereon, and so that the bows of the top will not be marred when they are folded in place within the holder. It is also expedient to so arrange the means for locking the holder upon the body, that said means may be readily accessible and yet be concealed within the holder itself.

To these ends the invention consists in providing a socket member 1 which is firmly secured upon the frame of the vehicle body 2 in any suitable manner with the outer open end of the socket lying substantially in the plane of the side of the body, so that when the body is upholstered the upholstering will cover the socket member, with the exception of the outer open end which is substantially flush with the body and presents no unsightly projection thereon. The socket member comprises a tubular open ended head adapted to receive a laterally projecting stem 3 formed integral with a straight bar 4 forming one side of the loop of the holder, the other side of said loop being formed by a bar 5 which is pivoted at 6 to the lower end of the bar 4 and is formed with any desired number of projections 7 on its inner side to project between the bows of the top and form separators therefor when the bows are placed in the holder and the holder closed. The upper end of the bar 5 is turned toward the bar 4 to abut the same when the holder is in closed position, and to lock the bar when in closed position with the bows of the top clamped thereby, said bar 5 is formed with a lug 8 at its upper end to be engaged by the end of a suitable lever 9 which is suitably attached near said end to a spring pivot link 10 which, in turn, is pivotally attached to the upper end of the bar 4. The lever 9 is formed to lie close against the outer surface of the bar 5 when in locked position, and is provided at its free or lower end with ears 11 which project laterally from each side of the lever. These ears form finger holds by means of which the operator may readily grasp the lever 9 to turn the same and open the loop of the holder. A good hold on the lever is provided by these ears as they extend laterally from each side thereof, and as they project slightly beyond the sides of the bar 5, they do not present an unsightly appearance or form projections upon which the top-curtains or other parts may catch.

The spindle or stem 3 is adjustably held in the socket 1 and firmly holds the holder attached to the vehicle body in properly adjusted position, by boring said stem inwardly from its outer end to receive a screw pin or bolt 12 and to form a recess 13 for the head 14 of said bolt which has a screw-threaded portion to engage a screwthreaded portion of the bore leading from the recess 13 longitudinally of the stem. This bolt has a tapered inner end 15 to engage a tapered inner end of the bore of the stem, which stem is slotted or split vertically and horizontally inward from its free end to a point beyond the tapered end of the bore. These transverse cuts or slots 16 form spring sections between them at the end of the stem, which sections are adapted to be sprung outwardly to expand the stem within the socket and thus frictionally hold it therein in any position to which it may be turned or adjusted longitudinally. By means of a suitable wrench, the bolt 14 may be quickly and easily turned to expand the stem or permit it to contract, and thus the holder may be quickly and easily detached or rigidly attached to or adjusted upon the body.

The stem 3 is preferably secured to or formed integral with one side of the bar 4 in off-set relation thereto thus positioning the bolt 14 out of alinement with the holder loop so that a wrench may be readily inserted in the socket 12 to turn the bolt. The loop of the holder is also set at a slight angle to the longitudinal axis of the stem so that the stem will extend at right angles to the side of the vehicle body and the loop will be in proper position to engage the bows of the top at right angles thereto, the angular relation between the stem and the loop being just sufficient to bring the loop squarely across the bows which diverge rearwardly, lying out of parallelism with the sides of the vehicle body when the top is lowered.

This construction of a cylindrical expanding stem to engage a socket on the body, permits of an adjustment of the holder loop on the body toward or from the side of the body, the stem being adapted to be moved longitudinally in the socket and then locked in adjusted position by expanding the stem in the socket. This adjustment is quite important as it is found that when vehicle tops are applied to vehicle bodies, the bows do not always lie at exactly the same distance from the side of the body at each side when the top is in folded position. By adjusting the loops of the holder toward or from the sides of the body slightly, they will aline with the bows of the top when said bows are in folded position and be in proper position to receive the bows when the top is collapsed. In order that the bows may be securely and rigidly clamped in the loop, it is important that said loop be adjustable about the axis of said stem to permit the turning of the loop to bring it to a position at right angles across the sides of the bows when in clamping position. With the construction shown, the stem is turned upon its longitudinal axis in its socket and thus the loop is readily adjusted angularly to a vertical plane. The locking bolt or pin 12 being entirely concealed within the hollow stem of the holder, is protected against injury and the liability of the bows being marred by coming in contact with the bolt head, is obviated. The fastening means being entirely concealed, there are no sharp angles or projections on the holder and a very simple and compact arrangement secured.

Having thus fully described my invention what I claim is:—

1. In a vehicle-top bow-holder, the combination of a socket member adapted to be secured to a vehicle body, means for embracing and holding the bows, a member forming the support for said means integral therewith and rotatively and slidingly adjustable longitudinally in said socket member, and means wholly concealed within said supporting member and exerting a force radial of the axis of rotation thereof to hold the same in adjusted position in said socket member.

2. In a vehicle-top bow-holder, the combination of a member adapted to be secured to a vehicle body and having a horizontally disposed socket, a loop member to embrace the bows comprising bars pivoted together at one end, a lever pivotally attached to the upper end of one bar to engage and lock the other and formed to conform to the outer side of said bar and provided with ears at its lower end projecting laterally from each side thereof, a hollow stem formed integral with one of the bars and projecting laterally therefrom with its bore opening therethrough, said stem having a smooth outer surface and split longitudinally at its free end, and an expanding member wholly concealed within the bore of the stem and operable through the end of the bore which opens through the bar, to expand the stem within the socket member.

In testimony whereof I affix my signature in presence of two witnesses.

FREDERICK KIEHLER.

Witnesses:
KARL H. BUTLER,
ANNA M. DORR.

Copies of this patent may be obtained for five cents each, by addressing the "Commissioner of Patents, Washington, D. C."